United States Patent
Smith et al.

(10) Patent No.: US 8,328,673 B2
(45) Date of Patent: Dec. 11, 2012

(54) VARIABLE SPEED ACCESSORY DRIVE SYSTEM

(75) Inventors: Anthony L. Smith, Troy, MI (US); Burak A. Gecim, Rochester Hills, MI (US); Patrick B. Usoro, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 449 days.

(21) Appl. No.: 12/581,213

(22) Filed: Oct. 19, 2009

(65) Prior Publication Data

US 2010/0035716 A1     Feb. 11, 2010

Related U.S. Application Data

(62) Division of application No. 11/551,775, filed on Oct. 23, 2006, now abandoned.

(51) Int. Cl.
*F16H 3/72* (2006.01)
*F16H 37/02* (2006.01)
*B60K 17/28* (2006.01)

(52) U.S. Cl. .................. 475/5; 475/210; 180/53.8

(58) Field of Classification Search ............ 475/5, 2, 475/149, 150, 151, 153, 208, 210; 180/65.2, 180/65.3, 53.5, 53.8
See application file for complete search history.

(56) References Cited

U.S. PATENT DOCUMENTS

| | | | |
|---|---|---|---|
| 5,492,189 A | 2/1996 | Kriegler et al. | |
| 5,558,173 A | 9/1996 | Sherman | |
| 5,747,883 A | 5/1998 | Hammer et al. | |
| 5,947,854 A | 9/1999 | Kopko | |
| 6,048,288 A | 4/2000 | Tsujii et al. | |
| 6,050,228 A | 4/2000 | Garnett et al. | |
| 6,468,175 B1* | 10/2002 | Lehongre | 475/5 |
| 6,852,063 B2* | 2/2005 | Takahashi et al. | 477/5 |
| 6,878,092 B1 | 4/2005 | Schustek et al. | |
| 6,878,094 B2* | 4/2005 | Kitamura et al. | 477/5 |
| 7,316,628 B2 | 1/2008 | Serkh | |
| 7,547,264 B2* | 6/2009 | Usoro | 475/5 |
| 7,753,147 B2* | 7/2010 | Usoro | 180/53.8 |
| 2004/0173174 A1 | 9/2004 | Sugino et al. | |
| 2006/0019785 A1* | 1/2006 | Holmes et al. | 475/5 |
| 2006/0025261 A1* | 2/2006 | Schmidt | 475/5 |
| 2007/0087889 A1* | 4/2007 | Rosemeier et al. | 475/205 |
| 2008/0179119 A1* | 7/2008 | Grenn et al. | 180/65.2 |

* cited by examiner

*Primary Examiner* — Roger Pang
(74) *Attorney, Agent, or Firm* — Quinn Law Group, PLLC

(57) ABSTRACT

The present invention provides an accessory drive system for a vehicle. The accessory drive system includes a planetary gear set having a first, second, and third planetary member. A torque transfer device operatively connects an engine with the first planetary member. A motor/generator is operatively connected to the second planetary member, and a plurality of accessories are operatively connected to the third planetary member. Engine output is transferable through the planetary gear set to drive the accessories, and the speed at which the accessories are driven is selectable by controlling the speed of the motor/generator.

8 Claims, 6 Drawing Sheets

VARIABLE SPEED ACCESSORY DRIVE SYSTEM

CLAIM OF PRIORITY AND CROSS-REFERENCE TO RELATED APPLICATIONS

This application is a Divisional Application of U.S. Non-Provisional patent application Ser. No. 11/551,775, filed on Oct. 23, 2006, which is hereby incorporated by reference in its entirety, and to which priority is claimed herein.

TECHNICAL FIELD

The present invention pertains generally to a variable speed accessory drive system for a vehicle.

BACKGROUND OF THE INVENTION

Driven accessories in a vehicle may include, for example, an air conditioning compressor, a power steering pump, and an alternator. These accessories are generally powered by output from the engine. Conventional automotive accessory drive systems include a drive pulley connected to an engine output shaft. A flexible chain or belt couples the drive pulley with a plurality of driven pulleys that are each operatively connected to an accessory. The operating speeds of the accessories in such a conventional drive system are directly proportional to the speed of the engine. Since the engine operates over a wide speed range (i.e., for example, between 500 rpm and 7,000 rpm), the accessories are typically designed to provide full capacity at the low end of the engine speed range in order to ensure that they remain operational. Therefore, at higher engine speeds, excess energy transferred to the accessories may be lost.

SUMMARY OF THE INVENTION

The present invention provides an accessory drive system for a vehicle. The accessory drive system includes a planetary gear set having a first, second, and third planetary member. A first torque transfer device operatively connects an engine with the first planetary member. A motor/generator is operatively connected to the second planetary member, and a plurality of accessories are operatively connected to the third planetary member through a second torque transfer device. Engine output is transferable through the planetary gear set to drive the accessories, and the speed at which the accessories are driven is selectable by controlling the speed of the motor/generator.

According to the preferred embodiment, the first planetary member is a ring gear member, the second planetary member is a sun gear member, and the third planetary member is a planet carrier member.

According to an alternate embodiment, the first planetary member is a sun gear member, the second planetary member is a planet carrier member, and the third planetary member is a ring gear member.

According to another alternate embodiment, the first planetary member is a ring gear member, the second planetary member is a planet carrier member, and the third planetary member is a sun gear member.

According to another alternate embodiment, the first planetary member is a planet carrier member, the second planetary member is a ring gear member, and the third planetary member is a sun gear member.

According to another alternate embodiment, the first planetary member is a planet carrier member, the second planetary member is a sun gear member, and the third planetary member is a ring gear member.

According to another alternate embodiment, the first planetary member is a sun gear member, the second planetary member is a ring gear member, and the third planetary member is a planet carrier member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Conventional accessory drive systems operate by transferring engine output directly to the accessories so the accessories are driven at a speed directly proportional to engine speed. Since the engine operates over a wide speed range (e.g., between 500 rpm and 7,000 rpm), the accessories are typically designed to provide full capacity at the low end of the engine speed range in order to ensure they remain fully operational. Therefore, when the engine is operating at higher speeds, conventional accessory drive systems transfer more energy to the accessories than necessary to provide adequate function. The excess energy transferred to the accessories causes inefficiency and diminishes fuel economy. The accessory drive system 10 (shown in FIG. 1) of the present invention allows the accessories to be driven at a predetermined optimal speed independent from the speed at which the engine is running in order to improve fuel economy. The predetermined optimal speed at which the accessories are driven may, for example, be a continuously calculated variable speed selected to optimally meet the needs and conditions of a particular application.

Figure 1:
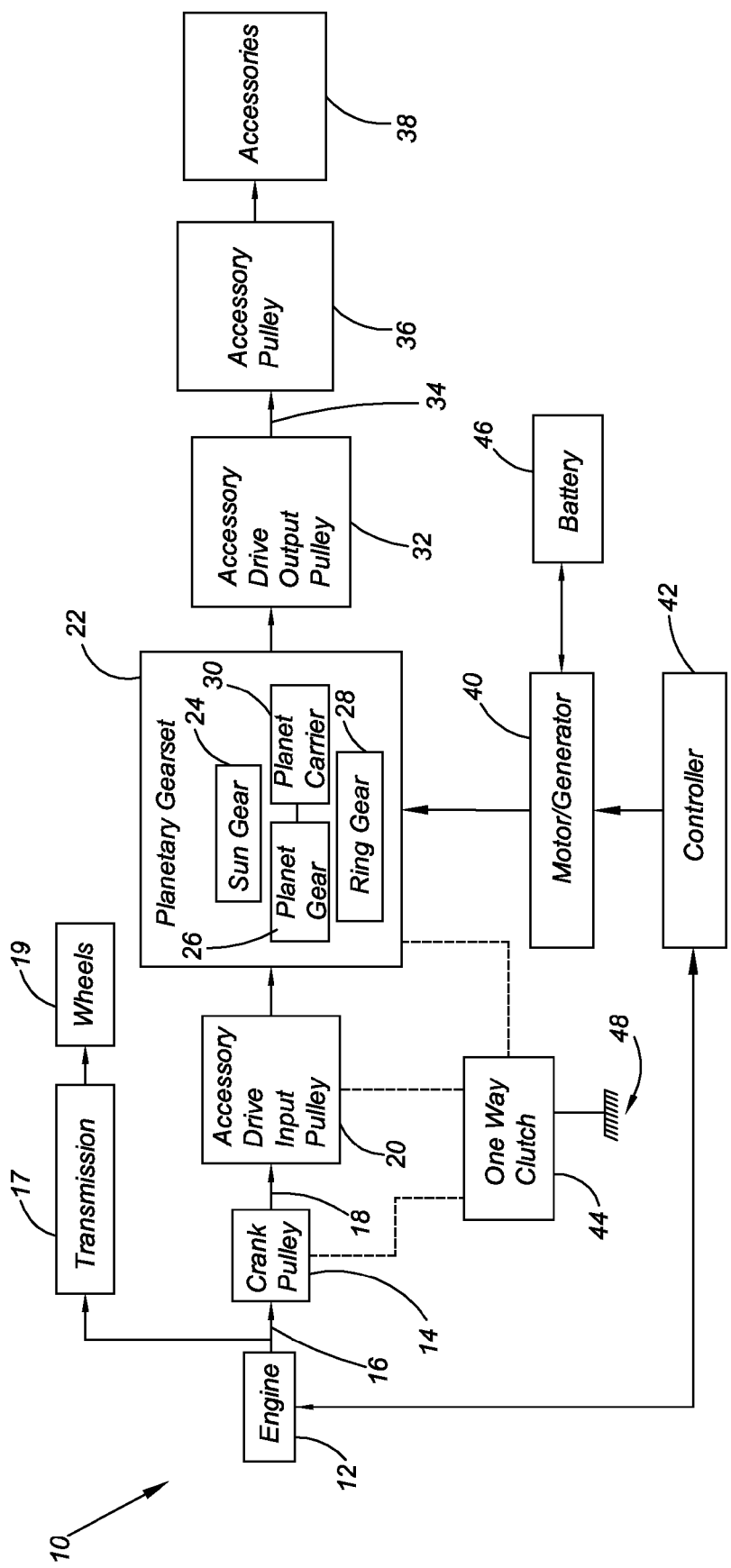
FIG. 1 is a schematic depiction of an accessory drive system for a vehicle.

Referring to FIG. 1, a schematic representation of an accessory drive system 10 for a vehicle is shown. The accessory drive system 10 includes an engine 12 configured to transmit output to a crank pulley 14 via a crankshaft or output shaft 16. Alternatively, engine output may be transferred to the crank pulley 14 in any known manner such as, for example, via a power take-off (not shown). A first belt or chain 18 couples the crank pulley 14 with an accessory drive input pulley 20. The accessory drive input pulley 20 is operatively connected to a differential transmission such as the planetary gearset 22. It should be appreciated that the accessory drive input pulley 20 may be directly connected to the planetary gearset 22, or may be indirectly connected to the planetary gearset 22 such as, for example, through a gear assembly (not shown). The planetary gearset 22 has a plurality of members including: a sun gear 24; a plurality of pinions or planet gears 26; a ring gear 28; and a pinion carrier or planet carrier 30.

The engine 12 also transfers output via the crankshaft 16 to a transmission 17. The transmission 17 transfers output from the engine 12 to a plurality of wheels 19 in order to drive a vehicle. It should be appreciated that the transmission 17 and wheels 19 may include any known configurations and are not included as part of the accessory drive system 10 of the present invention.

The planetary gearset 22 is configured to convert the rotational velocity of the accessory drive input pulley 20 (which runs at a fixed ratio of engine speed) to a predetermined value selected to efficiently drive the accessories 38. In other words, the planetary gearset 22 can selectively increase or decrease the magnitude of the rotational velocity from the accessory drive input pulley 20 in order to drive the accessories 38 at more efficient speed and thereby improve fuel economy. Output from the planetary gearset 22 is transferred to an accessory drive output pulley 32. A second belt or chain 34 couples the accessory drive output pulley 32 with one or more accessory pulleys 36. The accessory pulleys 36 are each operatively connected to an accessory 38.

A motor/generator 40 is configured to selectively transfer torque to the planetary gearset 22 either directly or through a transfer device such as, for example, a belt, chain, gear assembly, differential gear, etc. The motor/generator 40 is configured to receive power from and/or transfer power to a storage device such as the battery 46. As is known in the art, by transferring a first predetermined amount of input torque from the engine 12 to one of the planetary gear set 22 members, and transferring a second predetermined amount of input torque from the motor/generator 40 to another of the planetary gear set 22 members, the planetary gear set 22 can be controlled to produce a selectable amount of output torque from yet another of its members. Therefore, by controlling the amount of torque transferred from the motor generator 40 to the planetary gear set 22, the planetary gear set 22 output speed is selectable within an operational range.

The engine 12 and the motor/generator 40 are operatively connected to a controller 42. The controller 42 may also be operatively connected to one or more sensors (not shown) implemented to select an optimal output speed for the planetary gear set 22. The controller 42 receives input from the engine 12 indicating the current engine speed and calculates a corresponding motor/generator 40 speed or torque value required to produce the predetermined optimal planetary gear set 22 output speed. As an example, if the engine 12 is running at 4,000 rpm and the accessories 38 are optimized to run at 1,500 rpm, the controller 42 calculates the motor/generator 40 speed required to produce a planetary gear set 22 output speed of 1,500 rpm. These types of calculations which utilize the ring/sun tooth ratios of a planetary gear set are well known to those skilled in the art and therefore will not be described in detail hereinafter. After calculating, the controller 42 commands the motor/generator 40 to transfer the required amount of torque to the planetary gear set 22 such that the accessories 38 are driven in an optimally efficient manner.

The accessory drive system 10 of the present invention may, in some cases, be implemented to drive the accessories (not shown) of a vehicle when the engine is off. If, for example, the vehicle's engine (not shown) provides sufficient rotational resistance when off to effectively restrain the planetary member (not shown) connected thereto, a motor/generator (not shown) can be implemented to drive the accessories. The engine's rotational resistance is proportional to the force required to cyclically translate the engine components such as the engine pistons (not shown) when the engine is off. Therefore, if the amount of torque required to drive all the accessories causes a reaction torque at the engine which is less than the engine rotational resistance, the accessories can be driven by the motor/generator without also driving the engine.

Having explained the components and functionality of the accessory drive system 10, the precise interconnection of these components will now be described in accordance with a plurality of different embodiments. FIGS. 2-11 each illustrate a separate embodiment that functions similarly to the previously described accessory drive system 10, but includes somewhat different component connections. Like reference numbers are used in FIGS. 2-11 to refer to like components from FIG. 1. Additionally, the letters "a" through "j" added as a suffix to a reference numeral identifies a similar component in a different embodiment. As an example, the engine 12 of FIG. 1 functions similarly to the engines 12a-12j of FIGS. 2-11, respectively. Therefore, unless specified otherwise, the components of FIGS. 2-11 identified with a base reference number followed by one of the letters "a" through "j" should be considered to be identical to a respective component of FIG. 1 identified with a common base reference number.

Figure 2:
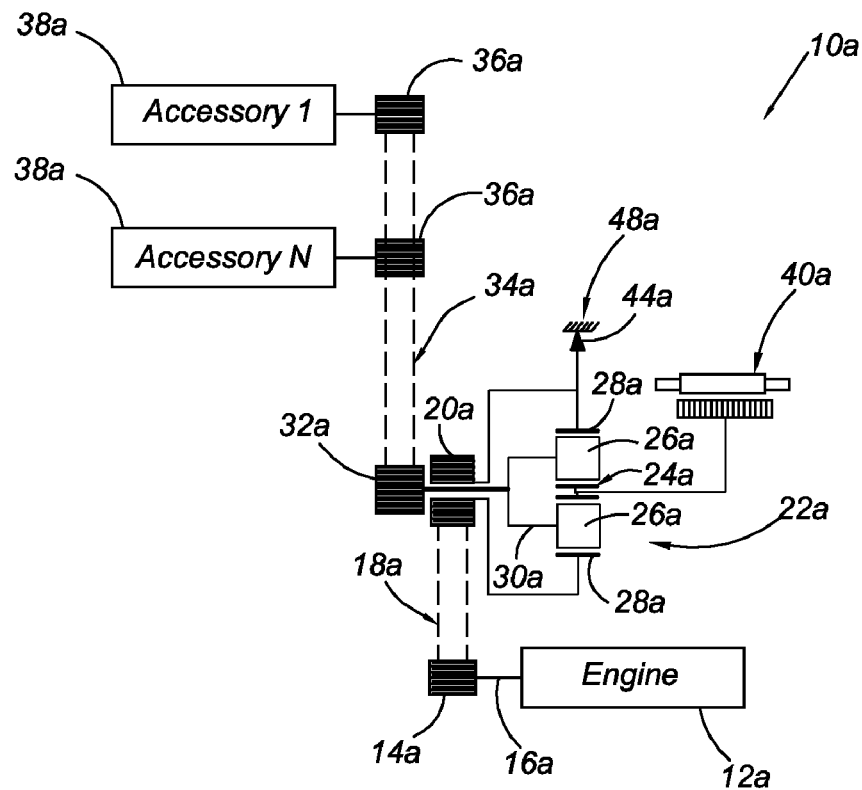
FIG. 2 is a more detailed schematic depiction of the accessory drive system of FIG. 1 in accordance with the preferred embodiment of the present invention.

Referring to FIG. 2, an accessory drive system 10a is shown in accordance with the preferred embodiment of the present invention. The accessory drive input pulley 20a (which runs at a fixed ratio of engine speed) is operatively connected to the ring gear 28a of the planetary gear set 22a. The motor/generator 40a is operatively connected to the sun gear 24a of the planetary gear set 22a. The planet carrier 30a of the planetary gear set 22a is operatively connected to the accessory drive output pulley 32a. Therefore, in response to input from the engine 12a (via the ring gear 28a) and/or the motor/generator 40a (via the sun gear 24a), the planetary gear set 22a can transfer output to the accessory drive output pulley 32a (via the planet carrier 30a) and thereby drive the accessories 38a at a selectable rate.

Figure 3:
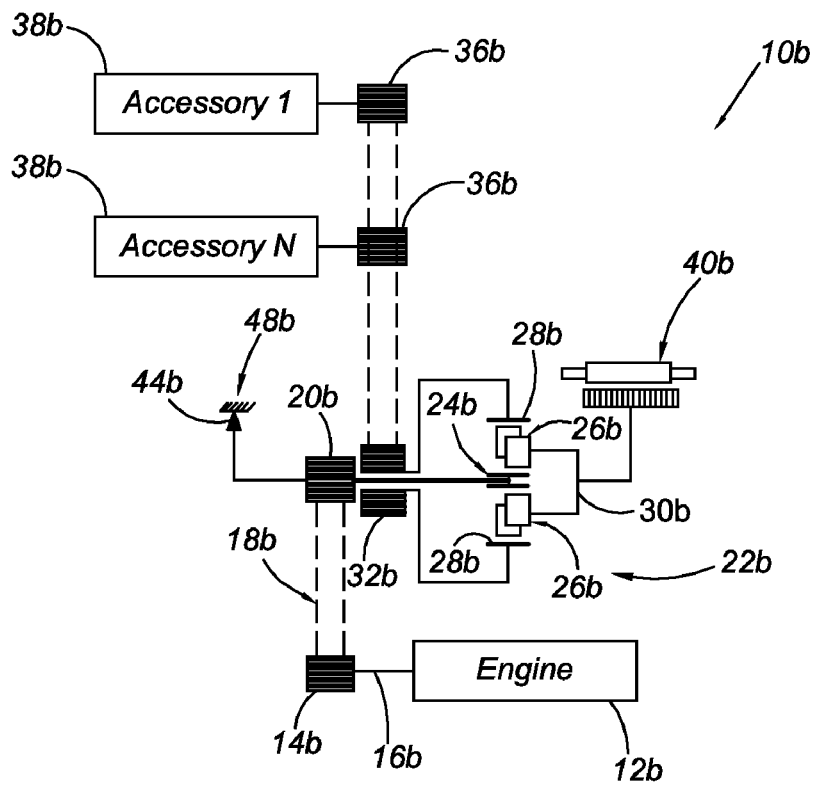
FIG. 3 is a more detailed schematic depiction of the accessory drive system of FIG. 1 in accordance with an alternate embodiment of the present invention.

Referring to FIG. 3, an accessory drive system 10b is shown in accordance with an alternate embodiment of the present invention. The planetary gear set 22b of this embodiment preferably includes a double-pinion carrier 30b configuration. The accessory drive input pulley 20b (which runs at a fixed ratio of engine speed) is operatively connected to the sun gear 24b of the planetary gear set 22b. The motor/generator 40b is operatively connected to the double-pinion carrier 30b of the planetary gear set 22b. The ring gear 28b of the planetary gear set 22b is operatively connected to the accessory drive output pulley 32b. Therefore, in response to input from the engine 12b (via the sun gear 24b) and/or the motor/generator 40b (via the double-pinion carrier 30b), the planetary gear set 22b can transfer output to the accessory drive output pulley 32b (via the ring gear 28b) and thereby drive the accessories 38b at a selectable rate.

Figure 4:
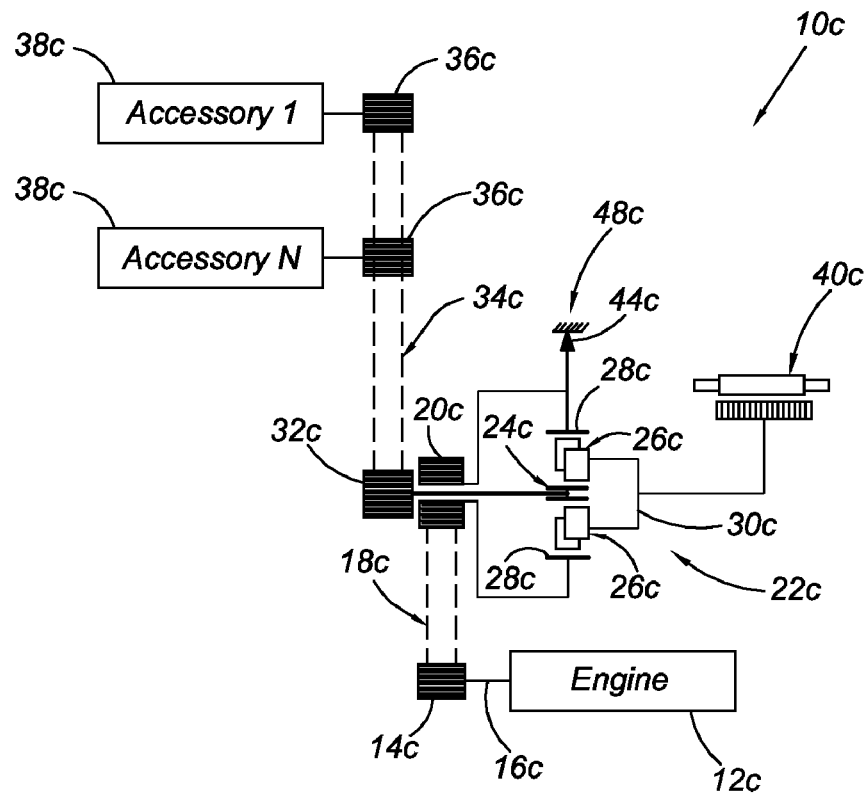
FIG. 4 is a more detailed schematic depiction of the accessory drive system of FIG. 1 in accordance with an alternate embodiment of the present invention.

Referring to FIG. 4, an accessory drive system 10c is shown in accordance with an alternate embodiment of the present invention. The planetary gear set 22c of this embodiment preferably includes a double-pinion carrier 30c configuration. The accessory drive input pulley 20c (which runs at a fixed ratio of engine speed) is operatively connected to the ring gear 28c of the planetary gear set 22c. The motor/generator 40c is operatively connected to the double-pinion carrier 30c of the planetary gear set 22c. The sun gear 24c of the planetary gear set 22c is operatively connected to the accessory drive output pulley 32c. Therefore, in response to input from the engine 12c (via the ring gear 28c) and/or the motor/generator 40c (via the double-pinion carrier 30c), the planetary gear set 22c can transfer output to the accessory drive output pulley 32c (via the sun gear 24c) and thereby drive the accessories 38c at a selectable rate.

Figure 5:
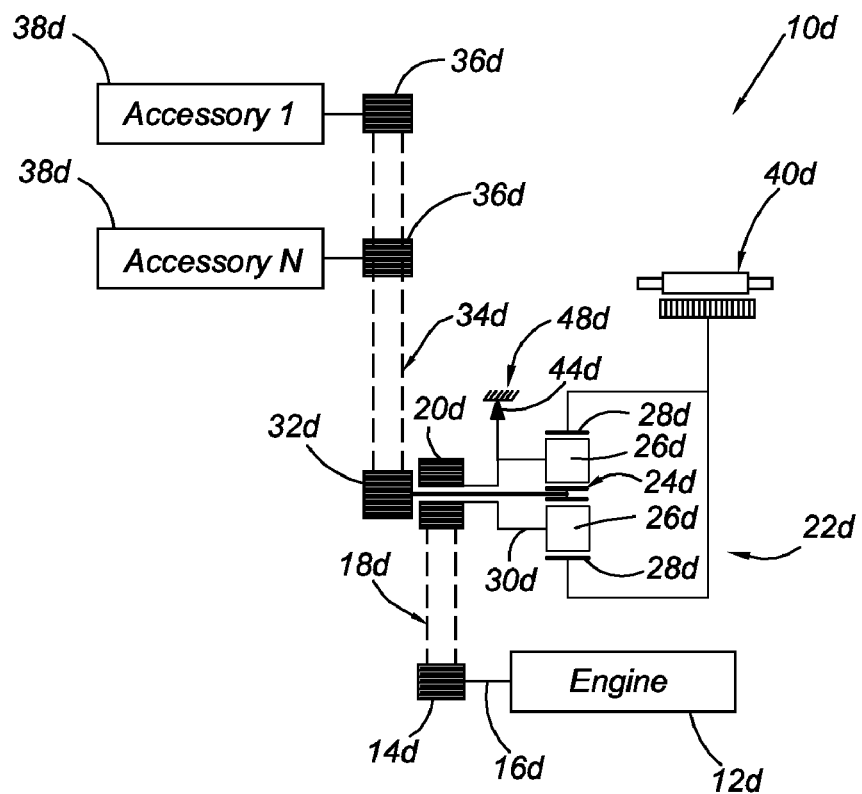
FIG. 5 is a more detailed schematic depiction of the accessory drive system of FIG. 1 in accordance with an alternate embodiment of the present invention.

Referring to FIG. 5, an accessory drive system 10d is shown in accordance with an alternate embodiment of the present invention. The accessory drive input pulley 20d (which runs at a fixed ratio of engine speed) is operatively connected to the planet carrier 30d of the planetary gear set 22d. The motor/generator 40d is operatively connected to the ring gear 28d of the planetary gear set 22d. The sun gear 24d of the planetary gear set 22d is operatively connected to the accessory drive output pulley 32d. Therefore, in response to input from the engine 12d (via the planet carrier 30d) and/or the motor/generator 40d (via the ring gear 28d), the planetary gear set 22d can transfer output to the accessory drive output pulley 32d (via the sun gear 24d) and thereby drive the accessories 38d at a selectable rate.

Figure 6:
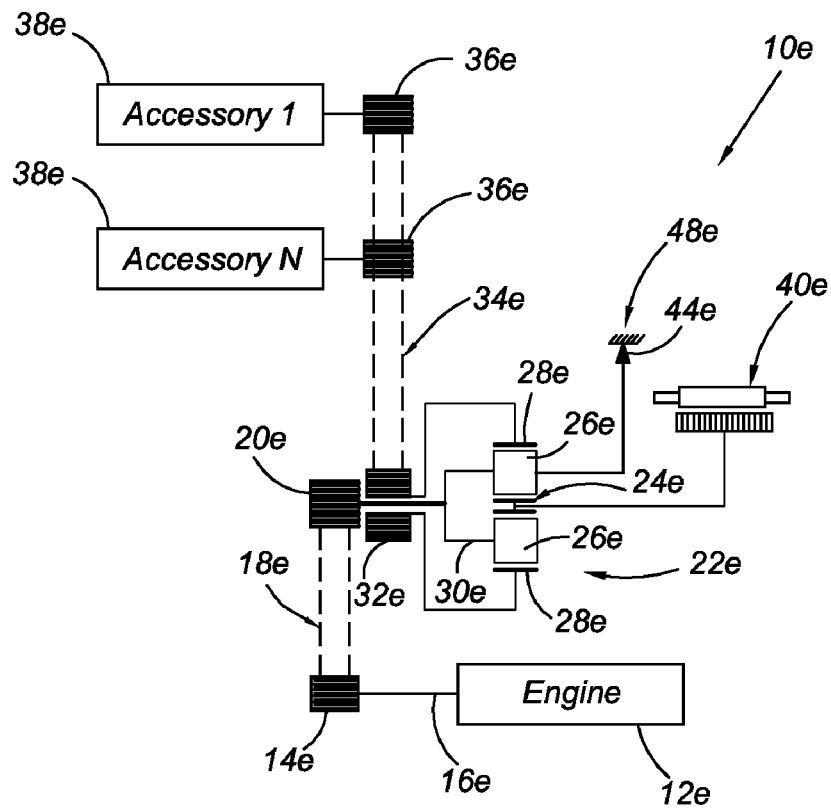
FIG. 6 is a more detailed schematic depiction of the accessory drive system of FIG. 1 in accordance with an alternate embodiment of the present invention.

Referring to FIG. 6, an accessory drive system 10e is shown in accordance with an alternate embodiment of the present invention. The accessory drive input pulley 20e (which runs at a fixed ratio of engine speed) is operatively connected to the planet carrier 30e of the planetary gear set 22e. The motor/generator 40e is operatively connected to the sun gear 24e of the planetary gear set 22e. The ring gear 28e of the planetary gear set 22e is operatively connected to the accessory drive output pulley 32e. Therefore, in response to input from the engine 12e (via the planet carrier 30e) and/or the motor/generator 40e (via the sun gear 24e), the planetary gear set 22e can transfer output to the accessory drive output pulley 32e (via the ring gear 28e) and thereby drive the accessories 38e at a selectable rate.

Figure 7:
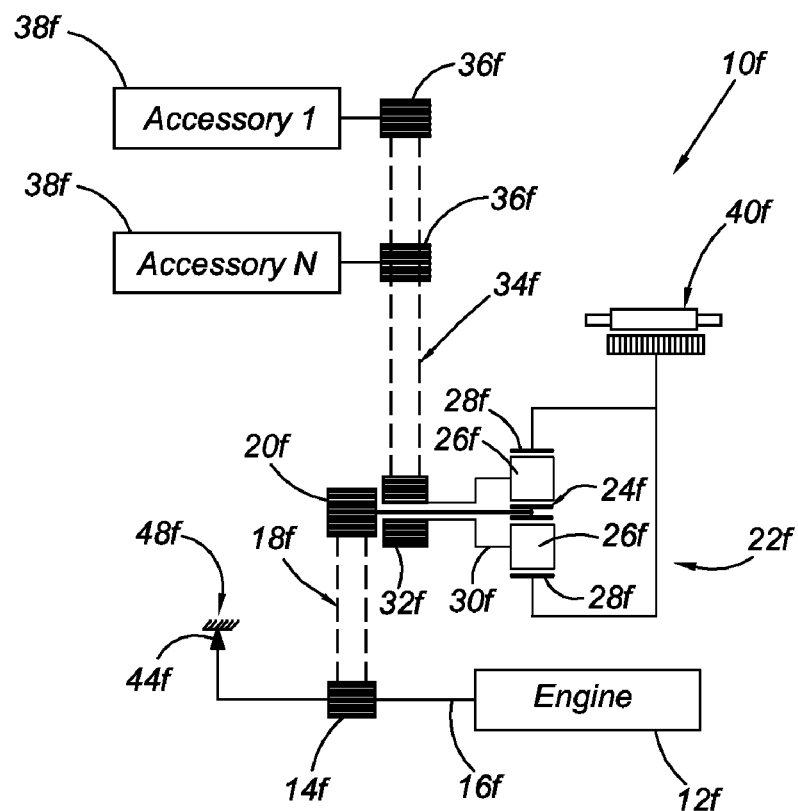
FIG. 7 is a more detailed schematic depiction of the accessory drive system of FIG. 1 in accordance with an alternate embodiment of the present invention.

Referring to FIG. 7, an accessory drive system 10f is shown in accordance with an alternate embodiment of the present invention. The accessory drive input pulley 20f (which runs at a fixed ratio of engine speed) is operatively connected to the sun gear 24f of the planetary gear set 22f. The motor/generator 40f is operatively connected to the ring gear 28f of the planetary gear set 22f. The planet carrier 30f of the planetary gear set 22f is operatively connected to the accessory drive output pulley 32f. Therefore, in response to input from the engine 12f (via the sun gear 24f) and/or the motor/generator 40f (via the ring gear 24f), the planetary gear set 22f can transfer output to the accessory drive output pulley 32f (via the planet carrier 30f) and thereby drive the accessories 38f at a selectable rate.

Figure 8:
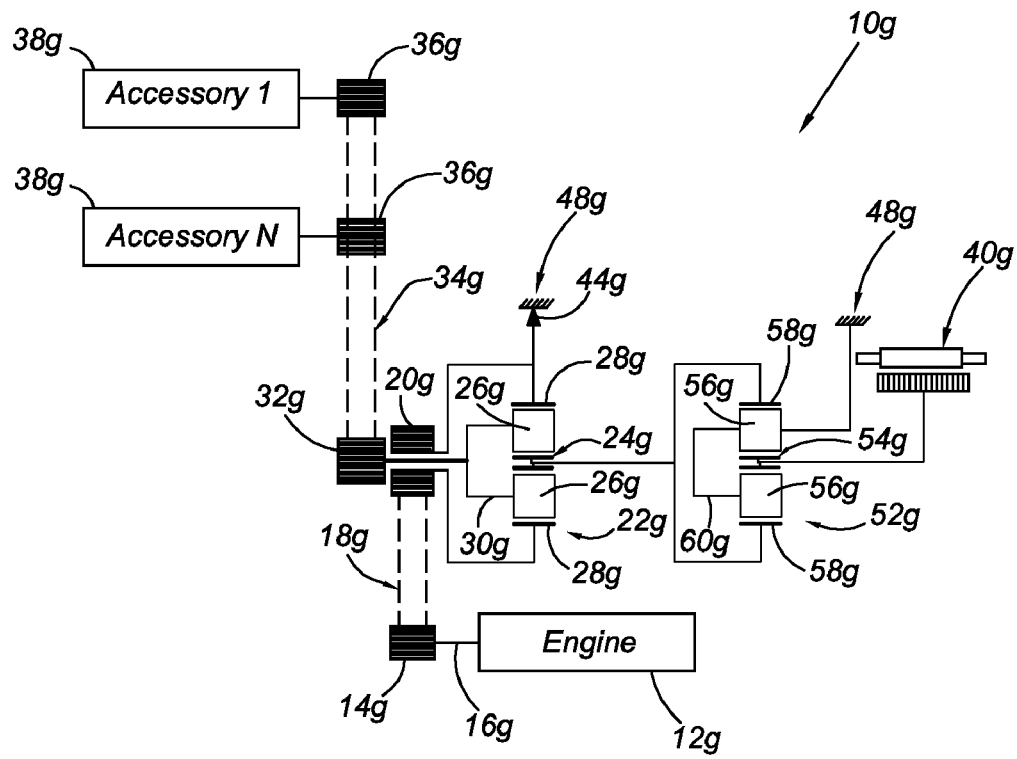
FIG. 8 is a more detailed schematic depiction of the accessory drive system of FIG. 1 in accordance with an alternate embodiment of the present invention.

Referring to FIG. 8, an accessory drive system 10g is shown in accordance with an alternate embodiment of the present invention. In addition to the previously identified accessory drive system components of the preferred embodiment, the accessory drive system 10g also includes a second planetary gear set 52g operatively connected to the planetary gear set 22g. The second planetary gear set 52g includes a sun gear 54g, a plurality of planet gears 56g, a ring gear 58g, and a planet carrier 60g.

The accessory drive input pulley 20g (which runs at a fixed ratio of engine speed) is operatively connected to the ring gear 28g of the planetary gear set 22g. The ring gear 58g of the second planetary gear set 52g is operatively connected to the sun gear 24g of the planetary gear set 22g. The motor/generator 40g is operatively connected to the sun gear 54g of the second planetary gear set 52g. The planet carrier 30g of the planetary gear set 22g is operatively connected to the accessory drive output pulley 32g, and the planet carrier 60g of the second planetary gear set 52g is grounded or held stationary at ground 48g. Therefore, in response to input from the engine 12g (via the ring gear 28g) and/or the motor/generator 40g (via the sun gear 54g), the planetary gear sets 22g, 52g can transfer output to the accessory drive output pulley 32g (via the planet carrier 30g) and thereby drive the accessories 38g at a selectable rate.

Figure 9:
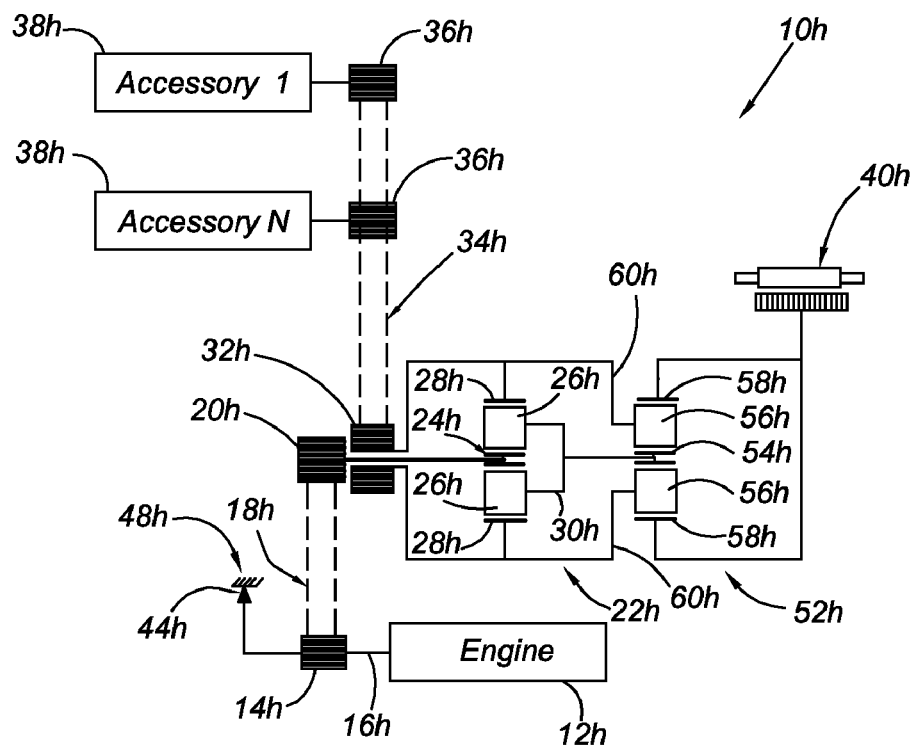
FIG. 9 is a more detailed schematic depiction of the accessory drive system of FIG. 1 in accordance with an alternate embodiment of the present invention.

Referring to FIG. 9, an accessory drive system 10h is shown in accordance with an alternate embodiment of the present invention. In addition to the previously identified accessory drive system components of the preferred embodiment, the accessory drive system 10h also includes a second planetary gear set 52h operatively connected to the planetary gear set 22h. The second planetary gear set 52h includes a sun gear 54h, a plurality of planet gears 56h, a ring gear 58h, and a planet carrier 60h.

The accessory drive input pulley 20h (which runs at a fixed ratio of engine speed) is operatively connected to the sun gear 24h of the planetary gear set 22h. The planet carrier 60h of the second planetary gear set 52h is operatively connected to the ring gear 28h of the planetary gear set 22h. The motor/generator 40h is operatively connected to the ring gear 58h of the second planetary gear set 52h. The ring gear 28h of the planetary gear set 22h is operatively connected to the accessory drive output pulley 32h. Therefore, in response to input from the engine 12h (via the sun gear 24h) and/or the motor/generator 40h (via the ring gear 58h), the planetary gear sets 22h, 52h can transfer output to the accessory drive output pulley 32h (via the ring gear 28h) and thereby drive the accessories 38h at a selectable rate.

Figure 10:
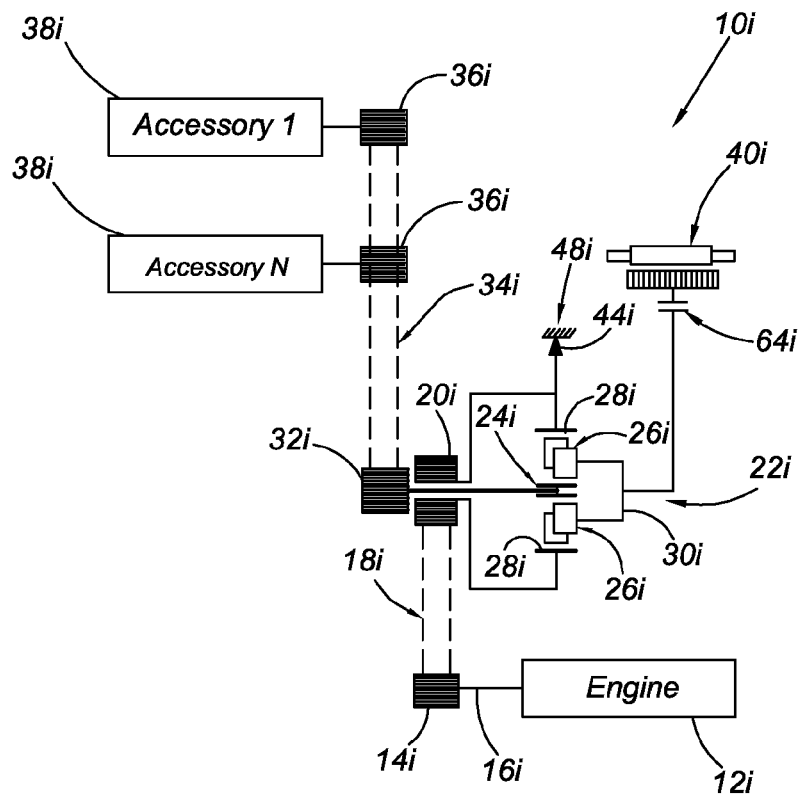
FIG. 10 is a more detailed schematic depiction of the accessory drive system of FIG. 1 in accordance with an alternate embodiment of the present invention.

Referring to FIG. 10, an accessory drive system 10i is shown in accordance with an alternate embodiment of the present invention. The planetary gear set 22i of this embodiment preferably includes a double-pinion carrier 30i configuration. The accessory drive input pulley 20i (which runs at a fixed ratio of engine speed) is operatively connected to the ring gear 28i of the planetary gear set 22i. A gear assembly 64i couples the motor/generator 40i with the double-pinion carrier 30i of the planetary gear set 22i. The sun gear 24i of the planetary gear set 22i is operatively connected to the accessory drive output pulley 32i. Therefore, in response to input from the engine 12i (via the ring gear 28i) and/or the motor/generator 40i (via the double-pinion carrier 30i), the planetary gear set 22i can transfer output to the accessory drive output pulley 32i (via the sun gear 24i) and thereby drive the accessories 38i at a selectable rate.

Figure 11:
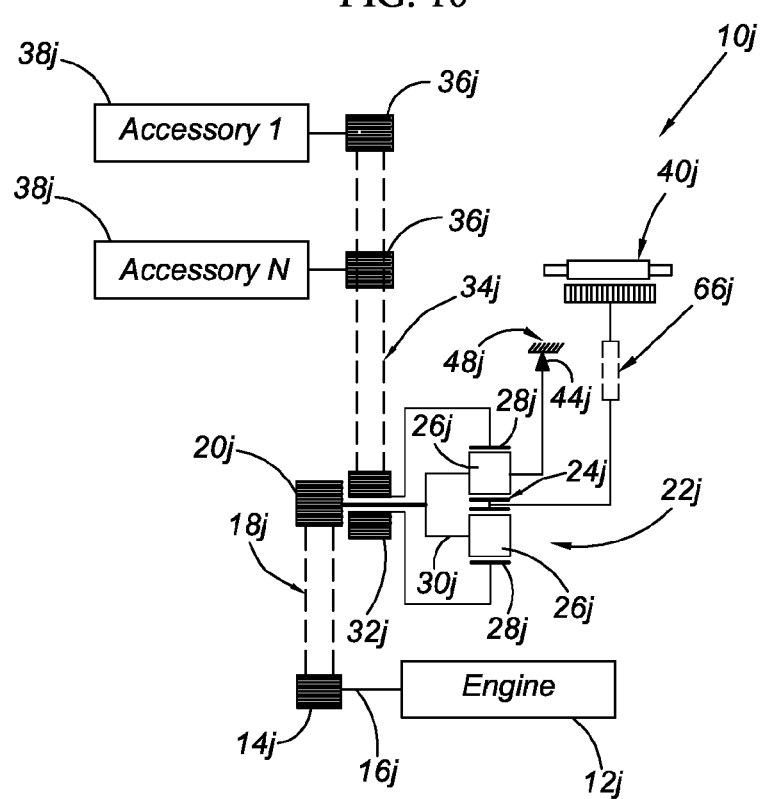
FIG. 11 is a more detailed schematic depiction of the accessory drive system of FIG. 1 in accordance with an alternate embodiment of the present invention.

Referring to FIG. 11, an accessory drive system 10j is shown in accordance with an alternate embodiment of the present invention. The accessory drive input pulley 20j (which runs at a fixed ratio of engine speed) is operatively connected to the planet carrier 30j of the planetary gear set 22j. A third belt or chain 66j couples the motor/generator 40j and the sun gear 24j of the planetary gear set 22j. The ring gear 28j of the planetary gear set 22j is operatively connected to the accessory drive output pulley 32j. Therefore, in response to input from the engine 12j (via the planet carrier 30j) and/or the motor/generator 40j (via the sun gear 24j), the planetary gear set 22j can transfer output to the accessory drive output pulley 32j (via the ring gear 28j) and thereby drive the accessories 38j at a selectable rate.

While the best modes for carrying out the invention have been described in detail, those familiar with the art to which this invention relates will recognize various alternative designs and embodiments for practicing the invention within the scope of the appended claims.

The invention claimed is:

1. An accessory drive system for a vehicle comprising:
   an engine;
   an accessory;
   an input member connected to said engine, such that said input member is configured to rotate at a fixed ratio relative to said engine;
   an output member connected to said accessory, such that said output member is configured to rotate at a fixed ratio relative to said accessory;
   a motor/generator;
   a first planetary gear set comprising a first, a second and a third gear member;
   a second planetary gear set comprising a first, a second and a third gear member;
   wherein said first member of said first planetary gear set is directly connected with said input member, said second member of said first planetary gear set is directly connected with said output member, said third member of said first planetary gear set is directly connected with said first member of said second planetary gear set, said second member of said second planetary gear set is directly connected with said motor/generator, and said third member of said second planetary gear set is directly connected with one of a stationary member, first member of said first planetary gear set, and said second member of said first planetary gear set; and
   wherein output from said engine is transferable through the planetary gear sets to drive said accessory through said output member, and the speed at which said output member is driven is selectable by controlling the speed of said motor/generator.

2. The accessory drive system of claim 1, further comprising a plurality of pulleys configured to transfer output from said engine to said accessory.

3. The accessory drive system of claim 2, further comprising at least one belt operatively connecting said plurality of pulleys.

4. An accessory drive system for a vehicle comprising:
   a first planetary gear set having a first, second, and third planetary member;
   a second planetary gear set having a first, a second and a third gear member; wherein said third member of said first planetary gear set is directly connected with said first member of said second planetary gear set, and said third member of said second planetary gear set is directly connected with one of a stationary member, said first member of said first planetary gear set, and said second member of said first planetary gear set;
   an input pulley;
   an engine operatively connected to said input pulley, such that the input pulley is configured to rotate at a fixed ratio relative to said engine, wherein said input pulley is directly connected to said first member of said first planetary gear set;
   a motor/generator directly connected to said second member of said second planetary gear set;
   an output pulley;
   a plurality of accessories operatively connected to said output pulley, such that said output pulley is configured to rotate at a fixed ratio relative to said plurality of accessories, wherein said output pulley is directly connected to said second member of said first planetary gear set; and
   wherein engine output is transferable through said first and second planetary gear sets to drive said plurality of accessories, and the speed at which said plurality of accessories are driven is selectable by controlling torque transfer from said motor/generator to said second member of said second planetary gear set.

5. The accessory drive system of claim 4, wherein one of said first, second, and third planetary members is a single-pinion carrier.

6. The accessory drive system of claim 4, wherein the first planetary member is a ring gear member, the second planetary member is a planet carrier member, and the third planetary member is a sun gear member.

7. The accessory drive system of claim 4, wherein the first planetary member is a sun gear member, the second planetary member is a ring gear member, and the third planetary member is a planet carrier member.

8. An accessory drive system comprising:
   a first planetary gear set having a first, second, and third planetary member;
   a second planetary gear set having a first, a second and a third gear member; wherein said third member of said first planetary gear set is connected for common rotation with said first member of said second planetary gear set, and said third member of said second planetary gear set is connected for common rotation with one of a stationary member, said first member of said first planetary gear set, and said second member of said first planetary gear set;
   an engine;
   a first torque transfer apparatus operatively connecting said engine to said first member of said first planetary gear set, such that said first member of said first planetary gear set is configured to rotate at a fixed ratio relative to said engine;
   a motor/generator connected for common rotation with said second member of said second planetary gear set;
   a second torque transfer apparatus operatively connecting an accessory to said second member of said first planetary gear set, such that said second member of said first planetary gear set is configured to rotate at a fixed ratio relative to said accessory; and
   wherein said engine provides sufficient rotational resistance while off to restrain said first member of said first planetary gear set from rotating and thereby allow said motor/generator to drive said accessory without also driving said engine.

* * * * *